United States Patent
Gan et al.

(10) Patent No.: US 12,022,390 B2
(45) Date of Patent: Jun. 25, 2024

(54) METHOD FOR SENDING WAKE UP PACKET

(71) Applicant: Huawei Technologies Co., Ltd., Shenzhen (CN)

(72) Inventors: Ming Gan, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 16/415,395

(22) Filed: May 17, 2019

(65) Prior Publication Data
US 2019/0274103 A1 Sep. 5, 2019

Related U.S. Application Data

(63) Continuation of application No. PCT/CN2017/110828, filed on Nov. 14, 2017.

(30) Foreign Application Priority Data

Nov. 18, 2016 (CN) .......................... 201611035617.2

(51) Int. Cl.
*H04W 52/02* (2009.01)
*H04W 72/54* (2023.01)
(Continued)

(52) U.S. Cl.
CPC ....... *H04W 52/0229* (2013.01); *H04W 52/02* (2013.01); *H04W 52/0219* (2013.01);
(Continued)

(58) Field of Classification Search
CPC ............. H04W 52/0229; H04W 52/02; H04W 52/0219; H04W 52/0235; H04W 52/028;
(Continued)

(56) References Cited

U.S. PATENT DOCUMENTS 9,276,755 B2 * 3/2016 Wang ..................... H04L 12/12
9,426,736 B2 8/2016 Kim et al.
(Continued)

FOREIGN PATENT DOCUMENTS

CN 102833829 A 12/2012
CN 104094665 A 10/2014
(Continued)

OTHER PUBLICATIONS

Shellhammer, Stephen, "Physical Layer Design for Wakeup Receiver", Oct. 21, 2016, pp. 1-2, 1-13 (Year: 2016).*
(Continued)

*Primary Examiner* — Ian N Moore
*Assistant Examiner* — Latresa A McCallum
(74) *Attorney, Agent, or Firm* — SLATER MATSIL, LLP

(57) ABSTRACT

A method in the field of networking technologies for sending a wake up packet, an apparatus, and a device. The method for sending a wake up packet is applied to a first node, wherein the first node maintains a first contention window (CW1) on a first channel, the first channel is a channel on which a main transceiver of a second node works, and the method includes generating a backoff count based on CW1, executing backoff based on the backoff count, and sending a wake up packet to the second node on a second channel when backoff ends, wherein the second channel is a channel on which a wake up receiver of the second node works.

20 Claims, 9 Drawing Sheets

---

Detect whether a NAV is set for a first node, where the NAV is set on a first channel — 701

When the NAV is set for the first node, ignore the NAV, and listen to whether a second channel is idle — 702

When detecting that the second channel is idle, a main transceiver of the first node sends a wake up packet to a second node on the second channel — 703

(51) Int. Cl.
*H04W 74/00* (2009.01)
*H04W 74/08* (2009.01)
*H04W 8/00* (2009.01)

(52) U.S. Cl.
CPC ..... *H04W 52/0235* (2013.01); *H04W 52/028* (2013.01); *H04W 72/54* (2023.01); *H04W 74/002* (2013.01); *H04W 74/08* (2013.01); *H04W 8/005* (2013.01); *Y02D 30/70* (2020.08)

(58) Field of Classification Search
CPC ... H04W 72/08; H04W 74/002; H04W 74/08; H04W 8/005; H04W 4/20; H04W 52/00; H04W 52/0222; H04W 52/0216; H04W 52/0277; H04W 52/0293; H04W 36/0094; H04W 74/04; H04W 36/0077; H04W 48/08; H04W 74/0833; H04W 74/02; H04W 40/24; H04W 48/16; H04W 72/54; H04W 72/542; H04W 74/0808; Y02D 30/70; Y02D 30/50; H04L 12/12; H04L 29/08648; H04L 29/0899; H04L 41/5058; H03G 3/3042
See application file for complete search history.

(56) References Cited

U.S. PATENT DOCUMENTS

| | | | |
|---|---|---|---|
| 9,544,848 B2 | 1/2017 | Jafarian et al. | |
| 2003/0145095 A1* | 7/2003 | Liu | H04W 28/02 709/230 |
| 2006/0050742 A1* | 3/2006 | Grandhi | H04B 7/02 370/506 |
| 2006/0133408 A1 | 6/2006 | Nogueira-Nine et al. | |
| 2007/0076743 A1* | 4/2007 | Chen | H04L 47/2441 370/445 |
| 2007/0160021 A1* | 7/2007 | Xhafa | H04W 74/002 370/338 |
| 2008/0279210 A1* | 11/2008 | Naka | H04W 28/18 370/448 |
| 2010/0091717 A1* | 4/2010 | Bonta | H04W 74/08 370/329 |
| 2011/0176465 A1* | 7/2011 | Panta | H04W 52/0235 370/311 |
| 2014/0050133 A1 | 2/2014 | Jafarian et al. | |
| 2014/0079046 A1* | 3/2014 | Yang | H04W 74/0825 370/338 |
| 2014/0112225 A1 | 4/2014 | Jafarian et al. | |
| 2015/0009878 A1* | 1/2015 | Kim | H04W 72/23 370/311 |
| 2015/0200811 A1 | 7/2015 | Kasslin et al. | |
| 2015/0334742 A1 | 11/2015 | Kim et al. | |
| 2016/0029373 A1* | 1/2016 | Seok | H04L 1/1848 370/338 |
| 2016/0073340 A1* | 3/2016 | Xue | H04W 52/386 455/522 |
| 2016/0286469 A1 | 9/2016 | Wang et al. | |
| 2016/0315675 A1* | 10/2016 | Seok | H04W 74/0816 |
| 2016/0337973 A1 | 11/2016 | Park et al. | |
| 2017/0048880 A1* | 2/2017 | Anderson | H04W 72/1226 |
| 2017/0055287 A1* | 2/2017 | Yang | H04W 74/0808 |
| 2017/0367095 A1* | 12/2017 | Chen | H04L 5/0053 |
| 2019/0327672 A1* | 10/2019 | Hwang | H04W 52/0206 |

FOREIGN PATENT DOCUMENTS

| | | | |
|---|---|---|---|
| CN | 104254137 A | 12/2014 | |
| CN | 104756560 A | 7/2015 | |
| CN | 104780510 A | 7/2015 | |
| CN | 105706498 A | 6/2016 | |
| CN | 105873232 A | 8/2016 | |
| JP | 2015529412 A | 10/2015 | |
| JP | 2016152595 A | 8/2016 | |
| JP | 2016524865 A | 8/2016 | |
| KR | 20150044921 A | 4/2015 | |
| KR | 20160022747 A | 3/2016 | |
| WO | 2016116143 A1 | 7/2016 | |
| WO | WO-2018070800 A1 * | 4/2018 | H04L 29/06 |

OTHER PUBLICATIONS

Aoudia, A. et al., "OPWUM: Opportunistic MAC Protocol Leveraging Wake-Up Receivers in WSNs," Journal of Sensors, Dec. 14, 2015, 11 pages.

"Part 11: Wireless LAN Medium Access Control (MAC) and Physical Layer (PHY) Specifications," IEEE Standard for Information Technology—Telecommunications and Information Exchange between systems Local and Metropolitan area networks—Specific requirements, IEEE Standards Association, IEEE Std 802.11, 2016, 3533 pages.

Doudou, M. et al., "Survey on Latency Issues of Asynchronous MAC Protocols in Delay-Sensitive Wireless Sensor Networks," IEEE Communications Surveys & Tutorials, vol. 15, No. 2, Second Quarter 2013, 23 pages.

Li, Y. et al., "DLI: A Dynamic Listen Interval Scheme for Infrastructure-based IEEE 802.11 WLANs," 2015 IEEE 26th Annual International Symposium on Personal, Indoor and Mobile Radio Communications—(PIMRC): MAC and Cross-Layer Design, 2015, 5 pages.

* cited by examiner

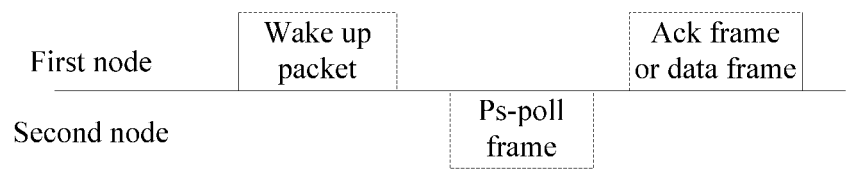

FIG. 10

Receive, by using a wake up receiver of a second node, a wake up packet sent by a first node, to wake up a main transceiver of the second node — 1101

When the main transceiver of the second node is woken up and sends a first frame unsuccessfully to the first node, the main transceiver generates a backoff count based on a contention window, and sends the unsuccessfully sent frame to the first node based on the backoff count — 1102

FIG. 11

METHOD FOR SENDING WAKE UP PACKET

CROSS-REFERENCE TO RELATED APPLICATIONS

This application is a continuation of International Application No. PCT/CN2017/110828, filed on Nov. 14, 2017, which claims priority to Chinese Patent Application No. 201611035617.2, filed on Nov. 18, 2016. The disclosures of the aforementioned applications are incorporated herein by reference in their entireties.

TECHNICAL FIELD

The present application relates to the field of network technologies, and in particular, to a method for sending a wake up packet, a method for sending a first frame after node wake-up, an apparatus, and a device.

BACKGROUND

When a first node needs to send data to a second node, the second node usually needs to listen to the first node. To reduce listening power consumption of a main transceiver of the second node, a low power wake up receiver (LP-WUR) may be added in the second node. When needing to send data to the second node, the first node first sends a wake up packet to the second node, the wake up receiver of the second node wakes up the main transceiver of the second node after receiving the wake up packet, and the woken up main transceiver communicates with the first node.

Usually, by default, a main transceiver of the first node listens to a channel corresponding to the main transceiver of the second node. Each Media Access Control (MAC) frame carries a "duration" field, to update network allocation vectors (NAV) of all stations except for a non-destination reception station. This is a mechanism to overcome a problem of hiding a node. A NAV function logically exists in the MAC layer, and provides a virtual carrier sense mechanism to enhance physical carrier sense. Before sending the wake up packet to the second node, the first node needs to determine whether a NAV is set for the first node, and listens to a channel and determine whether the channel is idle (physical carrier sense). When no NAV is set for the first node and the detected channel is idle, the first node sends the wake up packet to the second node.

During actual application, the main transceiver and the wake up receiver of the second node may work on different channels. If the first node listens to only the channel corresponding to the main transceiver of the second node, when the NAV is set for the first node by using a frame on the channel, even though a channel corresponding to the wake up receiver of the second node is idle, the first node cannot send the wake up packet to the second node. As a result, the main transceiver of the second node cannot be woken up in time when the channel corresponding to the wake up receiver of the second node is idle.

SUMMARY

To resolve a related-technology problem that a main transceiver of a second node cannot be woken up in time when a channel corresponding to a wake up receiver of the second node is idle because a NAV is set for a first node, embodiments of the present application provide a method for sending a wake up packet, a method for sending a first frame after node wake-up, an apparatus, and a device. The technical solutions are as follows.

According to a first aspect, a method for sending a wake up packet is provided. The method is applied to a first node, a NAV of the first node is set on a first channel, and the method includes when detecting that a second channel is idle, ignoring, by the first node, the NAV, and sending, by a main transceiver of the first node, a wake up packet to a second node on the second channel. The first channel is a channel on which a main transceiver of the second node works, and the second channel is a channel on which a wake up receiver of the second node works.

When the first channel on which a main transceiver of the second node works is different from the second channel on which the wake up receiver of the second node works, the first channel is listened to by default. When the NAV is set for the first node by using a frame on the first channel, but the second channel is idle, the first node can still send the wake up packet to the second node on the second channel, to wake up the main transceiver of the second node. This implements that the main transceiver of the second node can be woken up in time when the second channel is idle.

According to a second aspect, a method for sending a wake up packet is provided. The method is applied to a first node, a first type NAV of the first node is set for a first channel, the first channel is a channel on which a main transceiver of a second node works, a second type NAV of the first node is set for a second channel, the second channel is a channel on which a wake up receiver of the second node works, the second channel is different from the first channel, and the method includes when detecting that the second channel is idle and that no second type NAV is set for the first node, sending, by a main transceiver of the first node, a wake up packet to the second node on the second channel.

When the first channel on which the main transceiver of the second node works is different from the second channel on which the wake up receiver of the second node works, both the first channel and the second channel are listened to. When no second type NAV is set for the first node by using a frame on the second channel, and the second channel is idle, the first node may send the wake up packet to the second node on the second channel, to wake up the main transceiver of the second node. This implements that the main transceiver of the second node can be woken up in time when the second channel is idle.

According to a third aspect, a method for sending a wake up packet is provided. The method is applied to a first node, the first node maintains a first contention window CW1 on a first channel, and the method includes generating a backoff count based on CW1, executing backoff based on the backoff count, and sending a wake up packet to the second node on a second channel when backoff ends. The first channel is a channel on which a main transceiver of the second node works, and the second channel is a channel on which a wake up receiver of the second node works.

An initial backoff count used to send the wake up packet on the second channel may be the backoff count currently maintained on the first channel, and therefore the wake up packet can be transmitted faster without increasing a collision probability.

In a first possible implementation of the third aspect, the method further includes when the wake up packet is sent unsuccessfully, keeping CW1 unchanged on the second channel.

When the wake up packet is sent unsuccessfully, keeping CW1 unchanged on the second channel can ensure that, the first node does not need to wait for a relatively long time to reuse the contention window that is kept unchanged on the second channel to send the wake up packet. This reduces an interval for sending the wake up packet, and the main transceiver of second node can be woken up in time.

With reference to the third aspect or the first possible implementation of the third aspect, in a second possible implementation, the first node maintains a second contention window CW2 on the second channel, CW2 is updated based on CW2_min and CW2_max that are maintained on the second channel, and after the executing backoff based on the backoff count, and sending a wake up packet to the second node on a second channel when backoff ends, the method further includes when the wake up packet is sent unsuccessfully, setting the current CW2 to (CW2+1)*2−1, where the updated CW2 does not exceed CW2_max, or when the wake up packet is sent successfully, resetting CW2 to CW2_min.

When the wake up packet is sent unsuccessfully, enlarging the maintained CW2 on the second channel can ensure that, a collision is avoided when the first node uses the contention window enlarged on the second channel to resend the wake up packet, thereby increasing a success rate of sending the wake up packet.

With reference to the third aspect, the first possible implementation of the third aspect, or the second possible implementation of the third aspect, in a third possible implementation, CW2_min and CW2_max are specified by an access point AP.

With reference to the third aspect, the first possible implementation of the third aspect, the second possible implementation of the third aspect, or the third possible implementation of the third aspect, in a fourth possible implementation, the method includes when the main transceiver of the first node returns to the first channel to send an 802.11 frame, reading the backoff count maintained on the first channel, executing backoff based on the backoff count, and sending the 802.11 frame when backoff ends.

With reference to any one of the third aspect or the first possible implementation of the third aspect to the fourth possible implementation of the third aspect, in a fifth possible implementation, the method further includes selecting any access category or defining a new access category used for sending the wake up packet.

The first node may independently select the access category to send the wake up packet. Therefore, a transmission latency of the wake up packet can be reduced without increasing a collision probability.

According to a fourth aspect, a method for sending a first frame after node wake-up is provided. The method is applied to a second node, and the method includes receiving, by using a wake up receiver of the second node, a wake up packet sent by a first node, to wake up a main transceiver of the second node, and generating a backoff count based on a contention window, executing backoff based on the backoff count, sending, by the main transceiver of the second node, a first frame when backoff ends, when the main transceiver of the second node sends a first frame to the first node unsuccessfully after the main transceiver of the second node is woken up, sending the unsuccessfully sent frame to the first node when backoff ends.

After the main transceiver of the second node wakes up and sends the first frame unsuccessfully, the main transceiver of the second node may generate the backoff count based on the contention window, execute backoff based on the backoff count, and resend the unsuccessfully sent frame. The contention window is determined by a service priority of sending the first frame by the second node, and therefore the second node may send the first frame after wake-up, to reduce a latency for notifying the first node that the second node has been woken up.

In a first possible implementation of the fourth aspect, the contention window is determined by a contention window field carried in the wake up packet that is sent to the second node by the first node, or is determined by a contention window field in a wake-up beacon frame or a beacon frame broadcast by an access point AP.

With reference to the fourth aspect or the first possible implementation of the fourth aspect, in a second possible implementation, sending the unsuccessfully sent frame to the first node when backoff ends, comprises performing again a step of generating a backoff count based on the contention window, executing backoff based on the backoff count, and sending the unsuccessfully sent frame to the first node when backoff ends, or performing again a step of executing backoff based on the backoff count, and sending the unsuccessfully sent frame to the first node when backoff ends.

With reference to the fourth aspect, the first possible implementation of the fourth aspect, or the second possible implementation of the fourth aspect, in a third possible implementation, the wake up packet carries an indication field that is used to indicate a backoff manner, and when a value of the indication field is a first value, the backoff manner is performing again a step of generating a backoff count based on the contention window, executing backoff based on the backoff count, and sending the unsuccessfully sent frame to the first node when backoff ends, or when a value of the indication field is a second value, the backoff manner is performing again a step of executing backoff based on the backoff count, and sending the unsuccessfully sent frame to the first node when backoff ends.

According to a fifth aspect, an apparatus for sending a wake up packet is provided. The apparatus includes at least one unit, and the at least one unit of the apparatus for sending a wake up packet is configured to implement corresponding steps in the method for sending a wake up packet of the first aspect.

According to a sixth aspect, an apparatus for sending a wake up packet is provided. The apparatus includes at least one unit, and at least one unit of the apparatus for sending a wake up packet are configured to implement corresponding steps in the method for sending a wake up packet of the second aspect.

According to a seventh aspect, an apparatus for sending a wake up packet is provided. The apparatus includes at least one unit, and at least one unit of the apparatus for sending a wake up packet are configured to implement corresponding steps in the method for sending a wake up packet of the third aspect.

According to an eighth aspect, an apparatus for sending a first frame after node wake-up is provided. The apparatus includes at least one unit, and at least one unit of the apparatus for sending a first frame after node wake-up are configured to implement corresponding steps in the method for sending a first frame after node wake-up of the fourth aspect.

According to a ninth aspect, a hardware device is provided. The hardware device includes a processor, and a main transceiver connected to the processor. The main transceiver is configured to implement a corresponding step in the method for sending a wake up packet of the first aspect.

According to a tenth aspect, a hardware device is provided. The hardware device includes a processor, and a main transceiver connected to the processor. The main transceiver is configured to implement a corresponding step in the method for sending a wake up packet of the second aspect.

According to an eleventh aspect, a hardware device is provided. The hardware device includes a processor, and a main transceiver connected to the processor. The processor and the main transceiver are configured to implement corresponding steps in the method for sending a wake up packet of the third aspect.

According to a twelfth aspect, a hardware device is provided. The hardware device includes a processor, a main transceiver connected to the processor, and a wake up receiver connected to the main transceiver. The wake up receiver, the main transceiver, and the processor are configured to implement corresponding steps in the method for sending a wake up packet of the fourth aspect.

According to a thirteenth aspect, a computer readable medium is provided. The computer readable medium stores an instruction used to implement the method for sending a wake up packet provided in the first aspect.

According to a fourteenth aspect, a computer readable medium is provided. The computer readable medium stores an instruction used to implement the method for sending a wake up packet provided in the second aspect.

According to a fifteenth aspect, a computer readable medium is provided. The computer readable medium stores an instruction used to implement the method for sending a wake up packet provided in the third aspect.

According to a sixteenth aspect, a computer readable medium is provided. The computer readable medium stores an instruction used to implement the method for sending a first frame after node wake-up provided in the fourth aspect.

BRIEF DESCRIPTION OF THE DRAWINGS

FIG. 10 is a schematic diagram of a process in which a first node wakes up a second node according to an embodiment of the present application;

FIG. 11 is a flowchart of a method for sending a first frame after node wake-up according to an embodiment of the present application;

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

Figure 1:
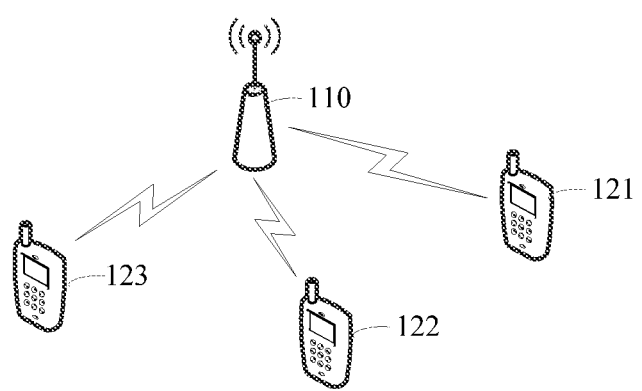
FIG. 1 is a schematic system diagram of a WLAN deployment scenario according to some embodiments of the present application.

The embodiments of the present application may be applied to a wireless local area network (WLAN). At present, a standard used in the WLAN is the Institute of Electrical and Electronics Engineers (IEEE) 802.11 series. The WLAN may include a plurality of basic service sets (BSS). A network node in the BSS is a station. The station includes an access point (AP) station and a non-access-point station (Non-AP STA). Each basic service set may include one AP and a plurality of non-AP STAs that are associated with the AP. It should be noted that, STAs (Stations) in the embodiments of the present application all are non-access-point stations, and APs in the embodiments of the present application are all access point stations. For example, referring to FIG. 1, FIG. 1 includes one access point AP (namely, an AP 110 in FIG. 1) and a plurality of STAs (namely, a STA 121, a STA 122, and a STA 123 in FIG. 1) associated with the AP. The AP may communicate with all of the STAs associated with the AP.

The access point station is also referred to as a wireless access point, a hotspot, or the like. The AP is an access point used to access a wired network and is mainly deployed at home, or inside a building or a campus, and has a typical coverage radius of tens to hundreds of meters. Certainly, the AP may also be deployed outdoors. The AP is equivalent to a bridge connecting a wired network and a wireless network. Main functions of the AP are connecting wireless network clients together to create a wireless network, and connecting the wireless network to Ethernet. Specifically, the AP may be a terminal device or a network device that has a Wireless Fidelity (WiFi) chip. Optionally, the AP may be a device supporting the 802.11ax standard. Further, optionally, the AP may be a device supporting multiple WLAN standards such as 802.11ac, 802.11n, 802.11g, 802.11b, and 802.11a.

The non-access-point station may be a wireless communications chip, a wireless sensor, or a wireless communications terminal. For example, the non-AP station is a mobile phone supporting a WiFi communication function, a tablet computer supporting a WiFi communication function, a set top box supporting a WiFi communication function, a smart TV supporting a WiFi communication function, a smart wearable device supporting a WiFi communication function, an in-vehicle communications device supporting a WiFi communication function, or a computer supporting a WiFi communication function. Optionally, the STA may support the 802.11ax standard. Further, optionally, the station further supports multiple WLAN standards such as 802.11ac, 802.11n, 802.11g, 802.11b, and 802.11a.

Figure 2:
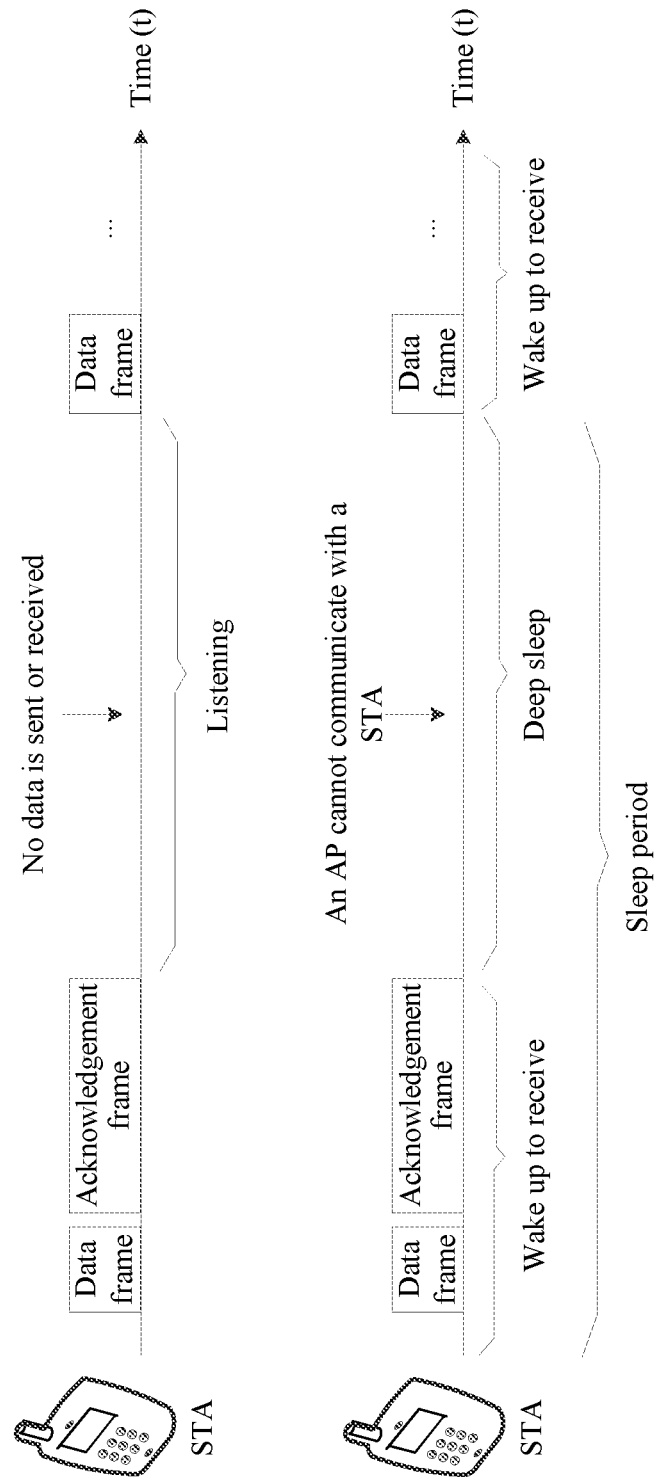
FIG. 2 is a schematic diagram of monitoring during no signal reception and a sleep policy in the conventional 802.11 protocol according to some embodiments of the present application.

In a WiFi network, a considerable portion of energy of a device is wasted on listening when no signal is received (idle listening). Currently, a related solution in the conventional 802.11 protocol (802.11 b/a/g/n/ac, or the like) focuses on sleep policy optimization of the device. As shown in a first time axis in FIG. 2, when the device (such as a STA) has no message to receive and send, continuous channel listening consumes a considerable portion of energy. Therefore, a sleep schedule is introduced in a second time axis shown in FIG. 2, so that the STA may enter a deep sleep state when there is no data received or sent, to reduce energy consumption caused by continuous listening. However, when the STA is in deep sleep, an AP cannot communicate with the STA, and transmission between the AP and the STA can be performed only after the STA wakes up. If the AP needs to send data to the STA while the STA is in deep sleep, some latency may be caused. To avoid a high latency resulting from the sleep schedule, the STA usually follows a sleep policy to wake up continually to check whether there is data to receive. This reduces sleep efficiency of the STA, and compared with long-time sleep, more energy is consumed if the STA continually wakes up while no useful data needs to be received.

Figure 3:
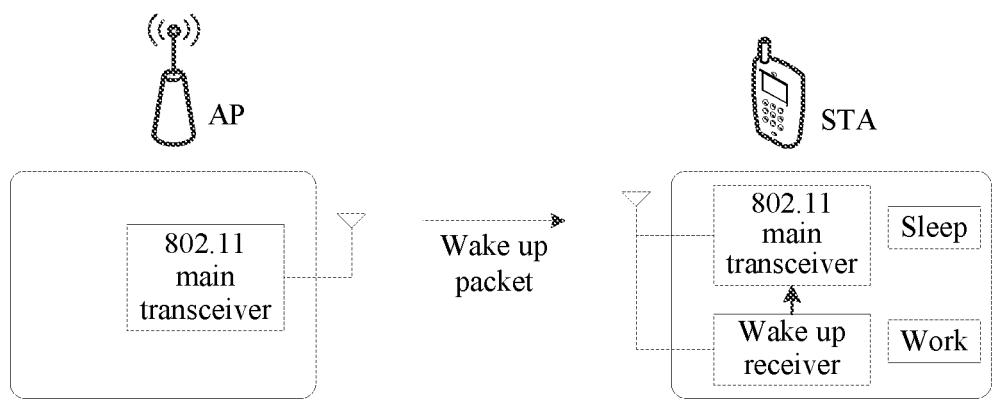
FIG. 3 is an application scenario diagram of a receive end having a wake up receiver according to some embodiments of the present application.

In addition to sleep policy optimization, another technical means to reduce a waste of energy consumed in device listening is to use a low power wake up receiver (LP-WUR) (referred to as a WUR herein). A core concept of the means is that, in addition to a conventional 802.11 transceiver end (also referred to as an 802.11 main radio, an 802.11 main transceiver, or a WiFi main transceiver), a receive end device (for example, the STA) further includes the low power wake up receiver. As shown in FIG. 3, when an 802.11 main transceiver module of the STA enters a deep sleep state, a low power WUR wakes up and starts to work. If another device (for example, an AP in the left part of FIG. 3) needs to communicate with a device having the WUR and the 802.11 main transceiver (for example, the STA in the right part of FIG. 3), the AP first sends a WUR wake up packet (WUP) to the WUR of the STA, the WUR of the STA wakes up the 802.11 main transceiver of the STA after correctly receiving the WUP that is sent to the WUR, and then the WUR switches to sleep. The AP communicates with the woken up 802.11 main transceiver of the STA. The 802.11 main transceiver of the STA enters a sleep state after completing communication with the AP, and the WUR of the STA wakes up to start to listen again whether there is a WUP to be sent to the WUR, so as to wake up the 802.11 main transceiver of the STA.

This technology uses the low power WUR instead of using the 802.11 main transceiver to listen to a channel when a medium is idle (Herein, energy consumption of the WUR in a listening/receiving state is expected to be approximately 0.1 to 1% of the 802.11 main transceiver, that is, less than 100 uW). This can effectively reduce a waste of energy consumption for device listening.

To implement low power consumption, a circuit structure, a frame structure design (for example, a WUP), and the like of the WUR need to be relatively simple and less complex. For example, the WUR circuit structure may include only an energy detection part and a radio frequency (RF) part, and therefore demodulation cannot be performed for some complex modulation schemes. In view of this, the WUP may use a modulation scheme simple in implementation such as on-off-keying (OOK), binary phase shift keying (BPSK), or frequency shift keying (FSK).

Figure 4A:
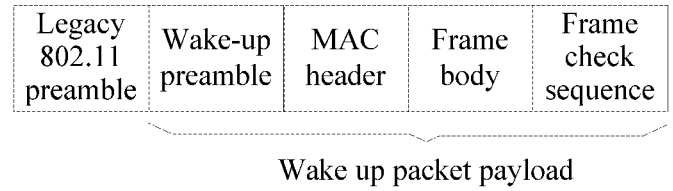
FIG. 4A is a schematic diagram of a frame structure of a wake up packet according to some embodiments of the present application.

FIG. 4A shows a possible WUP frame structure. The WUP frame structure starts with a legacy 802.11 preamble, so that the legacy 802.11 preamble can be parsed out by a surrounding 802.11 device (the surrounding 802.11 device that has read the preamble does not preempt a channel within a time), to protect a subsequent part of the wake up packet from being interfered with by the conventional 802.11 device. Following the legacy 802.11 preamble in the WUP frame structure, a payload part in the WUP is in OOK modulation, and can be parsed out only by the WUR. This part may include a wake-up preamble, a MAC header, a frame body, and a frame check sequence (FCS).

The wake-up preamble is used to identify a WUP signal. The MAC header may include a WUR ID used to distinguish different WURs. The frame body may carry other information. The frame check sequence is used to ensure consistency between received data and sent data. The WUR ID information herein may be a partial or complete station association identifier, or a WUR identifier allocated by the AP to the station, or a receiving MAC address or a partial receiving MAC address of the station, or other WUR information that can be used to distinguish between different stations. In addition, the WUR payload part may be narrowband transmission. To be specific, different from the legacy 802.11 preamble transmitted in a basic unit of 20-MHz bandwidth, the narrow band may be, for example, 1 MHz, 2 MHz, 4 MHz, 8 MHz, and 16 MHz. The WUR payload part may also be transmitted in a basic unit of 20-MHz bandwidth.

Figure 4B:
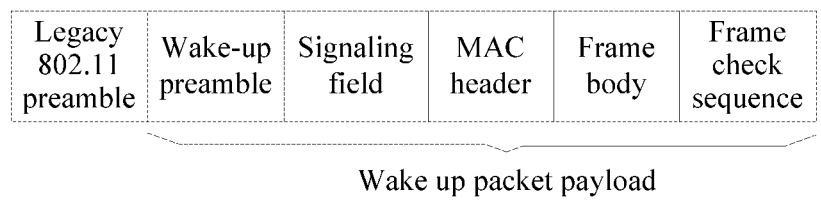
FIG. 4B is another schematic diagram of a frame structure of a wake up packet according to some embodiments of the present application.

FIG. 4B shows another possible WUP frame structure, including a legacy 802.11 preamble, a wake-up preamble, a signaling field, a MAC header, a frame body, and a frame check sequence. The signaling field is used to carry some physical layer signaling, such as an AP identifier, a WUR ID, and a modulation and coding indication.

During actual application, a device for sending a wake up packet may be an AP, or may be a device serving as a WiFi hotspot. Therefore, for ease of description, in the embodiments of the present application, the device for sending a wake up packet is referred to as a first node, and correspondingly, a device for receiving the wake up packet is referred to as a second node. Apparently, the device serving as a WiFi hotspot can also receive the wake up packet.

Figure 5:
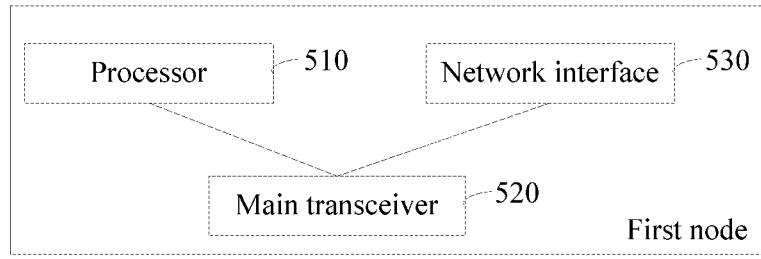
FIG. 5 is a schematic structural diagram of a first device according to some embodiments of the present application.

For a structure of the first node, refer to FIG. 5. In FIG. 5, the first node may include at least a processor 510, a main transceiver 520 (an 802.11 main transceiver herein), and a network interface 530.

The processor 510 includes one or more processing cores, and the processor 510 executes various functional applications and data processing by running a software program.

The main transceiver 520 is configured to communicate with another device, for example, communicate with the second node. The main transceiver 520 may be configured to send or receive an 802.11 frame (the 802.11 frame in this specification is a frame transmitted on a channel corresponding to the main transceiver, unless otherwise specified). The 802.11 frame may be a data frame, a control frame, and a management frame, or the like. The data frame is used for data transmission. The control frame is used for handshake communication and a positive acknowledgement during a contention period, and end of a contention-free period. A common control frame includes a poll frame, an acknowledgement (ACK) frame, and the like. The management frame is used for negotiation between a STA and an AP, and relationship control such as association, authentication, and synchronization. A common management frame may include a beacon frame, a probe request frame, a probe response frame, and the like.

In addition, the main transceiver 520 may also be configured to send a wake up packet to another device.

Optionally, the main transceiver 520 may include a medium access controller, a baseband chip, a radio frequency module, a power amplifier, and an antenna.

The main transceiver 520 is connected to the processor 510. After receiving a frame sent by another device, the main transceiver 520 sends the received frame to the processor 510 for processing. The main transceiver 520 may also listen to a channel, and select an appropriate time based on a listening status of the channel, to send an 802.11 frame or a wake up packet encapsulated by the processor 510 by using the antenna.

Optionally, when a first channel used for the 802.11 frame that needs to be sent is idle (it is determined, through both virtual carrier sense and physical carrier sense, that the first channel is idle), the main transceiver 520 may send the 802.11 frame on the first channel according to a backoff mechanism by using the antenna.

Optionally, when a second channel used for the wake up packet that needs to be sent is idle, the main transceiver 520 may send the wake up packet on the second channel according to the backoff mechanism by using the antenna.

In one implementation, if the main transceiver 520 performs virtual carrier sense only on the first channel or cannot perform virtual carrier sense on the second channel, when the main transceiver 520 determines though virtual carrier sense that the first channel is idle, and determines through physical carrier sense that the second channel is idle, the main transceiver 520 may send the wake up packet on the second channel according to the backoff mechanism by using the antenna.

In another implementation, if both the first channel and the second channel can be listened to through virtual carrier sense, when determining through both virtual carrier sense and physical carrier sense that the second channel is idle, the main transceiver 520 may send the wake up packet on the second channel according to the backoff mechanism by using the antenna.

The network interface 530 may be an Ethernet interface or a wired network interface.

Optionally, the first node may further include a memory, and the memory is connected to both the processor 510 and the main transceiver 520. For example, the memory may be connected to the processor 510 and the main transceiver 520 by using a bus. The memory may be configured to store a software program and a module.

Optionally, the memory may be implemented by using any type of volatile or nonvolatile storage device or a combination thereof, such as a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disc.

A person skilled in the art may understand that the structure of the first node shown in FIG. 5 does not constitute a limitation on the first node, and the first node may include parts more or fewer than those shown in the figure, or a combination of some parts, or parts disposed differently.

Figure 6:
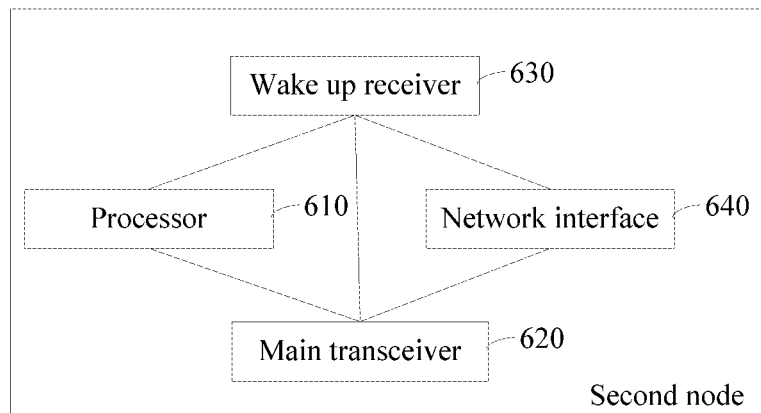
FIG. 6 is a schematic structural diagram of a second device according to some embodiments of the present application.

For a structure of the second node, refer to FIG. 6. In FIG. 6, the second node may include at least a processor 610, a main transceiver 620 (an 802.11 main transceiver herein), a wake up receiver 630, and a network interface 640.

The processor 610 includes one or more processing cores, and the processor 610 executes various functional applications and data processing by running a software program.

The main transceiver 620 is configured to communicate with another device, for example, communicate with the first node. The main transceiver 620 may be configured to send and receive an 802.11 frame.

Optionally, the main transceiver 620 may include a medium access controller, a baseband chip, a radio frequency module, a power amplifier, and an antenna. The main transceiver 620 is connected to the processor 610, and sends a frame encapsulated by the processor 610 to another device, or sends a frame sent by another device to the processor 610.

Optionally, the wake up receiver 630 is connected to the main transceiver 620, and the wake up receiver 630 may receive a wake up packet, wake up the main transceiver 620 after receiving the wake up packet, and enter a sleep state after waking up the main transceiver 620. Optionally, the wake up receiver 630 is not connected to the main transceiver 620, the wake up receiver 630 is connected to the processor 610, and the wake up receiver 630 may receive a wake up packet to notify the processor 610 to wake up the main transceiver 620.

After waking up, the main transceiver 620 sends a frame to a transmit end of the wake up packet according to a backoff mechanism, to notify the transmit end that the second node has been woken up. In addition, the main transceiver 620 may listen to a channel, and receive a 802.11 frame sent by another device. When the main transceiver 620 has no data to receive or send, the main transceiver 620 enters a sleep mode, and the wake up receiver 630 wakes up to receive the wake up packet.

The network interface 640 may be an Ethernet interface or a wired network interface.

Optionally, the second node may further include a memory, and the memory is connected to the processor 61*o*, the main transceiver 620, and the wake up receiver 630*o*. For example, the memory may be connected to the processor 610, the main transceiver 620, and the wake up receiver 630 by using a bus. The memory may be configured to store a software program and a module.

Optionally, the memory may be implemented by using any type of volatile or nonvolatile storage device or a combination thereof, such as an SRAM, an EEPROM, an EPROM, a PROM, a ROM, a magnetic memory, a flash memory, a magnetic disk, or an optical disk.

A person skilled in the art may understand that the structure of the second node shown in FIG. 6 does not constitute a limitation on the second node, and the second node may include parts more or fewer than those shown in the figure, or a combination of some parts, or parts disposed differently.

It should be further noted that, if the first node is a mobile phone used as a WiFi hotspot, a wake up receiver with a function similar to that of the wake up receiver 630 may also be disposed in the first node. Whether the first node has a wake up receiver is not limited in the embodiments of the present application.

Usually, before sending data, a station needs to consider whether a NAV is set for the station and listen to a channel and determine whether a channel is idle. When no NAV is set for the station and the detected channel is idle, the station listens for an XIFS (X inter frame space) time. If the channel is idle within the time, the station executes backoff, and can preempt, only after a count backs off to 0, the channel to send data. The XIFS time herein is related to a type of a to-be-sent service. Specifically, if a response frame is sent, such as an ACK, a Block Ack frame, a CTS (clear to send) frame, the XIFS time is a SIFS (short IFS) time, and the station does not need to execute backoff in this case, and directly preempts the channel to send the frame. If a beacon frame (the beacon frame in this specification is a beacon frame transmitted on a channel corresponding to the main transceiver, namely, an 802.11 beacon frame, unless otherwise specified) is sent, the XIFS time is a PIFS (PCF (Point coordinate function) IFS) time, the station does not need to execute backoff in this case, and directly preempts the channel to send the frame. If a frame of conventional non-QoS (quality of service) data is sent, the XIFS time is a DIFS (DCF (Distributed coordinate function) IFS) time, and the station executes backoff, and preempts, only after a conventional backoff count backs off to 0, the channel to send the frame. If a frame of conventional QoS data is sent, the XIFS time is an AIFS (arbitration IFS) time, and the station executes backoff, and preempts, only after a backoff count backs off to 0, the channel to send the frame. QoS data is classified into AC_BK (background), AC_BE (Best effort), an AC_VI (video), and AC_VO (voice). For different access categories of data, AIFS time is different, and backoff counts are different. The AIFS time is separately AIFS [AC_BK], AIFS[AC_BE], AIFS[AC_VI], and AIFS [AC_VO], and the backoff counts are separately backoff [AC_BK], backoff [AC_BE], backoff [AC_VI], and backoff [AC_VO].

SIFS<PIFS<DIFS=AIFS[AC_VO]<AIFS[AC_VI] <AIFS[AC_BE]<AIFS[AC_BK], which may reflect priorities of different services.

During actual application, the main transceiver and the wake up receiver of the second node may work on different channels. However, the main transceiver of the first node usually listens to the first channel by default on which the main transceiver of the second node works (namely, a channel on which an 802.11 frame is transmitted), and set a network allocation vector (NAV) of the first node based on a frame on the first channel, which is referred to as virtual carrier sense. In other words, the NAV of the first node is set based on the frame on the first channel. Therefore, when the main transceiver of the first node needs to send a wake up packet, the main transceiver first determines whether the NAV is set for the first node. When no NAV is set for the first node, the main transceiver further listens to whether the second channel on which the wake up receiver of the second node works is idle. When detecting that the second channel is idle, the main transceiver sends a wake up packet on the second channel. Apparently, when the NAV is set for the first node by using the frame on the first channel, even though the second channel is idle, the main transceiver cannot send the wake up packet. As a result, the main transceiver of the first node cannot send the wake up packet to the second node in time when the second channel is idle, and further cannot wake up the main transceiver of the second node in time.

Figure 7:
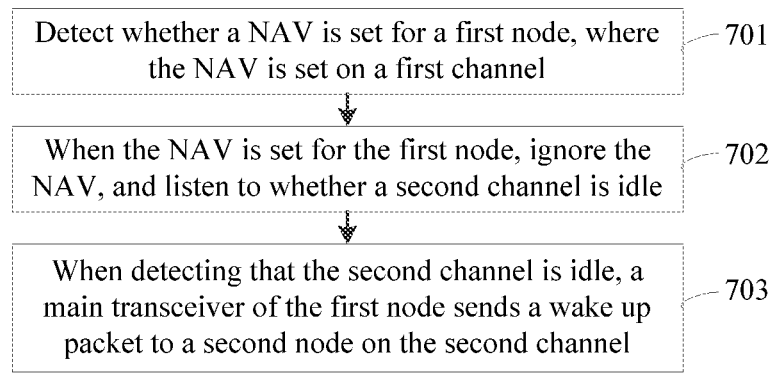
FIG. 7 is a flowchart of a method for sending a wake up packet according to an embodiment of the present application.
Figure 8:
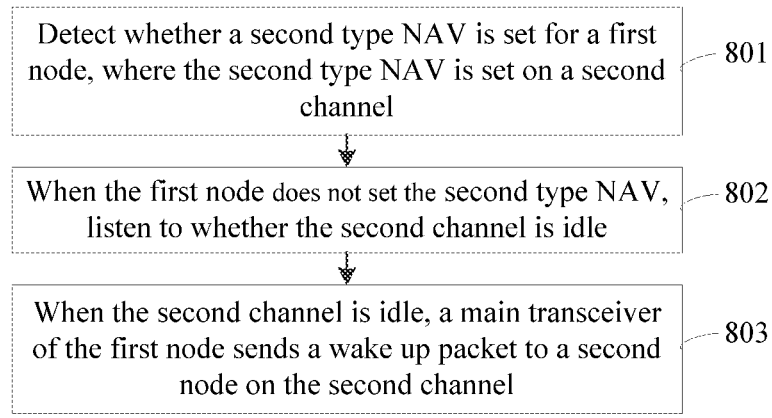
FIG. 8 is a flowchart of a method for sending a wake up packet according to another embodiment of the present application.

Therefore, considering that the main transceiver and the wake up receiver of the second node may work on different channels, two manners of sending a wake up packet by the first node are proposed in the embodiments of the present application, and the manners are separately described in steps shown in FIG. 7 and FIG. 8.

In one implementation, the first node cannot use a frame on the second channel to set the NAV. In other words, the first node can set the NAV by using only the frame on the first channel. In this case, the first node may ignore the specified NAV, and send a wake up packet to the second node on the second channel when the first node detects that the second channel is idle. For details, refer to FIG. 7.

FIG. 7 is a flowchart of a method for sending a wake up packet according to an embodiment of the present application. The method for sending a wake up packet is applied to the first node shown in FIG. 5, and the method for sending a wake up packet includes the following steps.

Step 701. Detect whether a NAV is set for the first node, where the NAV is set on a first channel.

When receiving, on the first channel, a frame that is not sent to the first node, the first node sets the NAV based on duration indicated by a duration field in the frame. Specifically, if the duration indicated by the duration field is greater than duration of the specified NAV (including 0, that is, no NAV is set), the NAV is updated to the duration indicated by the duration field, or if the duration indicated by the duration field is less than or equal to the duration of the specified NAV, the NAV is kept unchanged. The first channel herein is a channel on which a main transceiver of a second node works. Usually, the channel of the main transceiver includes a primary 20-MHz-channel, and may further include extensions of the primary 20-MHz-channel such as a secondary 20-MHz-channel, a secondary 40-MHz-channel, and a secondary 80-MHz-channel.

In one implementation, the first node may not include a wake up receiver. For example, when the first node is an AP, the first node usually does not include a wake up receiver. In this case, the first node usually listens to the first channel by default by using a main transceiver of the first node. Due to a capability limitation of the main transceiver, the main transceiver of the first node may not listen to the first channel and a second channel at the same time. In this case, the first node sets the NAV based on the occupation duration indicated by the duration field in the frame on the first channel. The second channel herein is a channel on which a wake up receiver of the second node works, and is usually a narrow channel, such as a 4-MHz-channel, a 5-MHz-channel, an 8-MHz-channel, a 10-MHz-channel, or a 16-MHz-channel.

Usually, to avoid that another device occupies the channel, when sending the 802.11 frame on the first channel, a device may set duration in a duration field in the frame. The duration indicates that the device sending the frame is to occupy the channel within the duration. When detecting the frame, the another device needs to perform backoff within the duration, that is, the another device does not send a frame on the first channel. Therefore, when the main transceiver of the first node listens to the first channel, and detects that the frame on the first channel carries the duration field, the first node sets the NAV of the first node based on the duration field in the frame, to avoid a collision resulted from that the first node occupies the channel within the duration indicated by the duration field. A value of the NAV is the same as a value of the duration field. Then, the first node sets a timer with timing duration the same as the value of the NAV. Before the timer expires, the first node does not send a frame on the first channel, and after the timer expires, the first node resets the NAV to zero. Then, the main transceiver of the first node may send a frame on the first channel.

Optionally, the first node updates the value of the specified NAV based on the duration field in the frame that is sent, on the first channel, not target to the first node. For example, when the first node detects that the duration field in the frame on the first channel is greater than the value of the specified NAV, the first node updates the value of the specified NAV to a value of a duration field in a newlydetected frame, and the timing duration of the timer increases accordingly. Otherwise, the NAV is kept unchanged.

In another implementation, the first node includes a wake up receiver. For example, the first node is a mobile phone serving as a WiFi hotspot. The mobile phone may usually include a wake up receiver, to receive a wake up packet sent by an AP. In this case, a main transceiver of the first node listens to the first channel, and sets the NAV based on occupation duration indicated by a duration field in a frame on the first channel. The wake up receiver of the first node listens to the second channel. When a wake up packet on the second channel does not have the duration field of the specified NAV, and the wake up receiver cannot parse out an 802.11 frame, the NAV is still not set for the first node by a frame on the second channel, that is, the first node can store only the NAV that is set by the frame on the first channel.

It can be learned from the foregoing two implementations that, the first node stores only the NAV that is set by the frame on the first channel. Therefore, if it is detected that the NAV is set for the first node, it indicates that the frame on the first channel occupies the channel.

Step 702. When the NAV is set for the first node, ignore the NAV, and listen to whether a second channel is idle.

If the NAV is set for the first node, it only indicates that the frame on the first channel occupies the channel, and if the second channel is idle, the first node can still send a wake up packet on the second channel. Therefore, when the NAV is set for the first node, the first node may ignore the NAV, and can still listen to whether the second channel is idle.

Optionally, when the first node does not include a wake up receiver, the main transceiver of the first node may temporarily listen to whether the second channel is idle.

Optionally, when the first node includes a wake up receiver, the wake up receiver of the first node may listen to whether the second channel is idle.

Step 703. When detecting that the second channel is idle, a main transceiver of the first node sends a wake up packet to a second node on the second channel.

When detecting that the second channel is idle, the main transceiver of the first node may send the wake up packet to the second node on the second channel.

In conclusion, according to the method for sending a wake up packet, when the first channel on which the main transceiver of the second node works is different from the second channel on which the wake up receiver of the second node works, the first channel is listened to by default. When the first node detects that the NAV is set for the first node by the frame on the first channel and that the second channel is idle, the first node can still send the wake up packet to the second node on the second channel, to wake up the main transceiver of the second node. This implements that the main transceiver of the second node can be woken up in time when the second channel is idle.

In another implementation, a first type NAV may be set for the first node by a frame on the first channel, and a second type NAV may be set by a frame on the second channel. In other words, the first node records two types of NAVs. In this case, assuming that the first node does not set the second type NAV and detects that the second channel is idle, the first node may send a wake up packet to the second node on the second channel. For details, refer to FIG. 8.

Each type of NAV includes at least one NAV. For example, for the first type NAV, the 802.11ax includes an inter-BSS NAV and an intra-BSS NAV, and the 802.11a/n/ac includes only one first type NAV. For another example, for the second type NAV, if the wake up receiver has a plurality of working channels but has no primary working channel, there are a plurality of corresponding second type NAVs. If the wake up receiver has a plurality of working channels and there is a primary working channel, there is one corresponding second type NAV.

FIG. 8 is a flowchart of a method for sending a wake up packet according to another embodiment of the present application. The method for sending a wake up packet is applied to the first node shown in FIG. 5, and the method for sending a wake up packet includes the following steps.

Step 801. Detect whether a second type NAV is set for the first node, where the second type NAV is set on a second channel.

The second channel is a channel on which a wake up receiver of a second node works, and the second channel is different from a first channel on which a main transceiver of the second node works.

In one implementation, the first node may not include a wake up receiver. In this case, if a main transceiver of the first node has a relatively strong listening capability, the main transceiver of the first node may listen to both the first channel and the second channel, set the first type NAV based on occupation duration indicated by a duration field in a frame on the first channel, and set the second type NAV based on occupation duration indicated by a duration field in a frame on the second channel. The first channel is a channel on which the main transceiver of the second node works.

In another implementation, the first node may include a wake up receiver. A main transceiver of the first node listens to the first channel, and sets the first type NAV based on a value of a duration field in a frame on the first channel. The wake up receiver of the first node listens to the second channel, and sets the second type NAV based on a value of a duration field in a frame on the second channel. The first channel is a channel on which the main transceiver of the second node works.

In other words, the frame on the first channel may carry a duration field, and the first node sets the first type NAV of the first node based on the duration field carried in the frame on the first channel, and the frame on second channel may also carry a duration field, and the second node sets the second type NAV of the second node based on the duration field carried in the wake up packet on the second channel. In this case, when the main transceiver of the first node needs to send a frame on the first channel, the main transceiver may refer to the first type NAV and consider whether the first channel is idle, or when the main transceiver of the first node needs to send a wake up packet on the second channel, the main transceiver may refer to the second type NAV and consider whether the second channel is idle, regardless of whether the first channel is idle in this case.

During actual application, the first node usually sets one first type NAV based on the frame only on the first channel, but may set at least one second type NAV based on a status of the second channel. Assuming that wake up receivers of a plurality of second nodes work on different second channels, when the first node listens to each second channel, if there is no primary working channel among these second channels, the first node sets a plurality of second type NAVs by using frames on these second channels. If there is a primary working channel among these second channels, the first node may set one second type NAV by using a frame on the primary working channel.

Step 802. When the first node does not set the second type NAV, listen to whether the second channel is idle.

When the first node does not set the second type NAV, it indicates that the frame on the second channel does not indicate an occupied channel. To avoid that some frames on the second channel do not indicate a duration field, in this case, the first node further needs to listen to whether the second channel is idle.

Likewise, when the first node listens to whether the second channel is idle, if the first node does not include a wake up receiver, the main transceiver of the first node listens to whether the second channel is idle, or if the first node includes a wake up receiver, the wake up receiver of the first node may listen to whether the second channel is idle, and then send a listening result to the main transceiver of the first node. Apparently, the wake up receiver of the first node may directly send the listening result of the second channel to the main transceiver of the first node, or may forward the listening result to the main transceiver of the first node by using a processor of the first node.

Step 803. When the second channel is idle, a main transceiver of the first node sends a wake up packet to a second node on the second channel.

When the first node does not set the second type NAV and detects that the second channel is idle, it is determined though virtual carrier sense and physical carrier sense that the second channel is idle. In this case, the main transceiver of the first node may send the wake up packet to the second node on the second channel.

In conclusion, in the method for sending a wake up packet, when the first channel on which the main transceiver of the second node works is different from the second channel on which the wake up receiver of the second node works, both the first channel and the second channel are listened to. When the first node detects that the NAV is not set for the first node by using the frame on the second channel and that the second channel is idle, the first node may send the wake up packet to the second node on the second channel, to wake up the main transceiver of the second node. This implements that the main transceiver of the second node can be woken up in time when the second channel is idle.

For example, the first node is an AP. The AP learns of network load information, and the AP triggers to wake up a corresponding station because the AP needs to send a downlink service to the station. When the second channel is idle, which is determined through both virtual carrier sense and physical carrier sense, and the AP maintains a contention window only on the first channel, the AP may independently select an access category (also referred to as a service priority) to execute backoff. In other words, the AP independently selects any access category to send a wake up packet. Specifically, the AP may determine, based on the access category, listened-to XIFS (X inter frame space) duration and a backoff count. If the channel is idle within the listened XIFS duration, the AP executes backoff based on the backoff count (the backoff count is a previously kept backoff count corresponding to an access category), and sends the wake up packet to the second node on the second channel after backoff ends.

For example, the XIFS duration may be a PIFS duration and the backoff count may be a non-backoff count (which is equivalent to that the backoff count is 0), or the XIFS duration may be DIFS duration and the backoff count may be a conventional backoff count, or the XIFS duration may be AIFS[AC] and the backoff count may be a backoff count backoff[AC]. AC is AC_BK, or AC_BE, or AC_VI, or AC_VO.

Considering that the first channel on which the main transceiver of the second node works is different from the second channel on which the wake up receiver of the second node works, the first node maintains the contention window (CW) on the first channel. The contention window may be represented as a first contention window CW1. Before sending a wake up packet on the second channel for the first time, the first node may generate a backoff count based on the contention window maintained on the first channel, execute backoff based on the backoff count, and send, for the first time, the wake up packet on the second channel when backoff ends.

If the wake up packet is sent unsuccessfully, the first node keeps the first contention window CW1 on the second channel unchanged, or to avoid frequency collisions on the second channel, the contention window maintained by the first node on the second channel may be a variable contention window.

In one implementation, the first node maintains an unchanged second contention window CW2 on the second channel. When sending a wake up packet for the first time, the first node uses the first contention window currently maintained on the first channel as an initial contention window maintained on the second channel, generates a backoff count based on the first contention window, executes backoff based on the backoff count, and sends the wake up packet to the second node on the second channel when backoff ends. When the wake up packet is sent unsuccessfully, the first contention window is kept unchanged on the second channel, and performs again a step of generating a backoff count based on the first contention window, executing backoff based on the backoff count, and sending the wake up packet to the second node on the second channel when backoff ends. In other words, provided that the wake up packet is sent unsuccessfully, the first contention window maintained by the first node on the second channel is kept unchanged.

If the second channel is busy during backoff, the first node suspends the backoff count, and executes backoff based on the suspended backoff count until the second channel is idle.

Figure 9A:
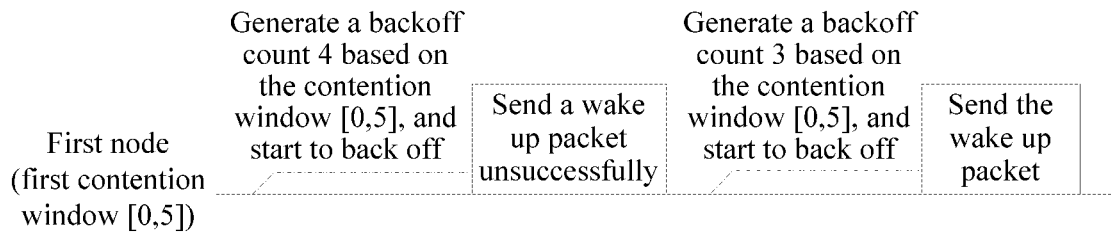
FIG. 9A is a flowchart of sending a wake up packet by using a backoff mechanism according to an embodiment of the present application.

For example, referring to FIG. 9A, when sending a wake up packet for the first time, the first node determines a first contention window [0,5] maintained on the first channel as an initial contention window maintained on the second channel, randomly generates a backoff count 4 based on the first contention window, and sends the wake up packet when the backoff count backs off to 0. When sending the wake up packet unsuccessfully, the first node randomly generates a backoff count still based on the first contention window [0,5], where the backoff count generated in the second time is 3 shown in FIG. 9A, and resends the wake up packet when the backoff count backs off to 0.

In another implementation, the first node maintains a variable second contention window CW2 on the second channel. CW2 may be enlarged from a minimum contention window CW2_min to a maximum contention window CW2_max. When sending a wake up packet for the first time, the first node uses the first contention window CW1 maintained on the first channel as an initial second contention window CW2 maintained on the second channel, generates a backoff count based on the second contention window, sends the wake up packet to the second node on the second channel based on the backoff count. When sending the wake up packet unsuccessfully, the first node enlarges the second contention window CW2, for example, sets the current CW2 to (CW2+1)*2−1, keeps enlarging the second contention window, and stops enlarging the second contention window CW2 until an enlarged second contention window is equal to the specified maximum contention window. When sending the wake up packet successfully, the first node resets the current second contention window to the minimum contention window.

If the second channel is busy during backoff, the first node suspends the backoff count, and executes backoff based on the suspended backoff count until the second channel is idle.

Figure 9B:
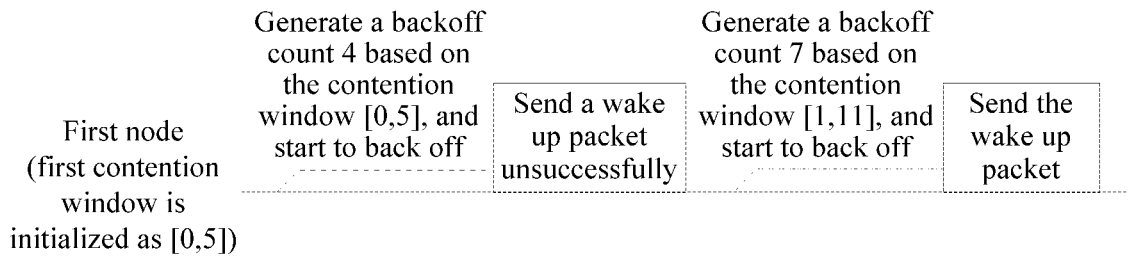
FIG. 9B is another flowchart of sending a wake up packet by using a backoff mechanism according to an embodiment of the present application.

For example, referring to FIG. 9B, when sending a wake up packet for the first time, the first node determines a first contention window [0,5] maintained on the first channel as an initial second contention window [0,5] maintained on the second channel, randomly generates a backoff count 4 based on the second contention window, and sends the wake up packet on the second channel when the backoff count backs off to 0. When sending the wake up packet unsuccessfully, the first node enlarges the second contention window based on CW2=(CW2+1)*2−1, where the enlarged second contention window is to [0,11], randomly generates a backoff count based on the enlarged second contention window [0,11], where the backoff count generated for the second time is 7 shown in FIG. 9B, and resends the wake up packet on the second channel when the backoff count backs off to 0.

In addition, when the first node is a non-AP station, the first node learns of, by using a beacon frame or a wake-up beacon frame broadcast by the AP, CW2_min and CW2_max maintained by the first node on the second channel. Updating of the window parameter is determined by the AP. When the first node is an AP station, CW2_min and CW2_max maintained by the first node on the second channel are independently determined by the AP or specified by a standard or a protocol.

The wake-up beacon frame has a structure similar to that of an 802.11 beacon frame, and is constructed by serially-connected elements. Similar to the 802.11 beacon frame, the wake-up beacon frame is broadcast periodically, and includes a corresponding wake-up radio parameter. To assist a main transceiver after wake-up in working properly, the wake-up beacon frame still needs to carry a critical parameter or a change indication field of a primary BSS corresponding to the current main transceiver.

After the main transceiver of the first node sends the wake up packet on the second channel, if the main transceiver still needs to send the 802.11 frame, the main transceiver of the first node sends the 802.11 frame on the first channel still based on the backoff count maintained on the first channel.

In the 802.11a/n/ac protocol, the AP broadcasts a beacon frame carrying a traffic indication map (TIM) field, to notify the specific stations associated with the AP that the AP have a downlink service to be sent to the stations. After a station in a power-saving mode detects the beacon frame, the station knows that the AP is to send the downlink service to the station, and may return to a sleep state. When the station wakes up and requires the AP to send the downlink service to the station, the AP sends a ps-poll frame to the AP. The ps-poll frame may notify the AP that the station wakes up, and that the AP may send the downlink service to the station. However, in this case, the ps-poll frame accesses a channel by using a priority AC_BE, to avoid a collision when a plurality of power-saving stations that wake up simultaneously access the channel at the same time by using a higher priority.

However, during wake-up radio, a problem that a plurality of stations wake up simultaneously does not exist. Usually, the AP specifies that a single station or several stations are to be woken up. If the AP specifies that a plurality of stations are to be woken up, the AP sends a trigger frame to query one by one whether the stations are woken up or query the plurality of stations simultaneously in a manner such as multi-user multiple-input multiple-output (MU-MIMO) or orthogonal frequency division multiple access (OFDMA). Therefore, the first frame that is sent after the station wakes up, such as a ps-poll, an ack frame, or a probe request frame, may access the channel with a higher priority. This application proposes that the AP controls the access category index (ACI) based on the network load information and other information. The AP may notify the station of the access category index by using a broadcast frame such as the beacon frame (including the wake-up beacon frame), or notify an association station by using a unicast frame such as an association response frame.

As shown in FIG. 10, the first frame that is sent by a woken up station is an ack frame, a ps-poll frame, a probe request frame, or the like. In FIG. 10, the ps-poll frame is used as an example. In a conventional manner, if the first frame is sent unsuccessfully, the contention window is doubled, and a backoff count is generated based on a new window to execute backoff (an action such as listening to an AIFS[BE] time when it is determined through physical carrier sense and virtual carrier sense that the channel is idle is omitted herein). As a result, a long latency for which the woken up station reports to a wake up packet transmit end that the station is already woken up is caused, and the wake up packet transmit end resends the wake up packet because the transmit end incorrectly considers that the station has not woken up. Therefore, this application proposes to modify a backoff procedure, to rapidly notify the wake up packet transmit station that the station has been woken up.

Referring to FIG. 11, FIG. 11 is a flowchart of a method for sending a first frame after node wake-up according to an embodiment of the present application. The method is applied to the second node shown in FIG. 6, and the method for sending a first frame after a main transceiver of the second node wakes up may include the following steps.

Step 1101. Receive, by using a wake up receiver of the second node, a wake up packet sent by a first node, to wake up the main transceiver of the second node.

When the second node wakes up the main transceiver of the second node, the wake up receiver of the second node may wake up the main transceiver of the second node, or the wake up receiver of the second node may wake up the main transceiver of the second node by using a processor of the second node.

Step 1102. When the main transceiver of the second node is woken up and sends a first frame unsuccessfully to the first node, the main transceiver generates a backoff count based on a contention window, and sends the unsuccessfully sent frame to the first node based on the backoff count.

The first frame is a frame that is sent at a first moment by the woken up main transceiver of the second node, including a ps-poll frame, an ack frame, and a probe request frame, and is not an acknowledgement frame in response to a data frame or an allowing sending frame in response to a sending request frame, that is proactively sent at a first moment by the first node after the main transceiver of the second node is woken up.

After being woken up, the main transceiver of the second node sends the first frame to the first node. The first frame herein may be the ack frame, the ps-poll frame, or the probe request frame. When the main transceiver sends the first frame unsuccessfully, the second node may generate a backoff count based on a contention window carried in the wake up packet, execute backoff based on the backoff count, and when backoff ends, send the unsuccessfully sent frame to the first node by using the main transceiver of the second node.

An access category of the wake up packet sent by the second node is determined by an access category field carried in the wake up packet sent by the first node, or an access category field in a wake-up beacon frame and an 802.11 beacon frame that are broadcast by an AP, or an access category field carried in an association response frame sent by an AP, or a new access category specified in a standard or a protocol.

In one implementation, the contention window herein is determined by the access category of the first frame sent by the second node.

In another implementation, the contention window herein is determined by a contention window field carried in the wake up packet that is sent to the second node by the first node, or is determined by a contention window field in a wake-up beacon frame or a beacon frame broadcast by the access point AP.

In conclusion, in the method for sending a first frame after wake-up of a main transceiver of the second node provided in this embodiment of the present application, the first node may specify different contention windows for nodes based on service priorities of second nodes. When the second node executes backoff based on the contention window specified by the first node, the second node may access a channel by using a relatively high priority, and notify the first node in time that the second node has been woken up. This reduces a latency for sending data by the first node to the second node.

When the main transceiver of the second node wakes up and sends the first frame unsuccessfully, to make the second node rapidly send the first frame successfully, this application uses the following two manners In a first manner, when the main transceiver of the second node sends the unsuccessfully sent frame to the first node, the second node performs again a step of generating a backoff count based on the contention window, and sending the unsuccessfully sent frame to the first node based on the backoff count. In other words, when the main transceiver of the second node needs to resend the frame that is unsuccessfully sent after main transceiver of the second node wakes up, the second node generates the backoff count still based on the maintained contention window, and the contention window is kept unchanged. The second node is woken up by the first node, and usually only one second node is woken up at one moment. Therefore, a collision does not exist after the second node is woken up and sends the first frame, and the second node keeps the contention window unchanged to send the first frame successfully as soon as possible, instead of enlarging the contention window to reduce a collision frequency.

Figure 12A:
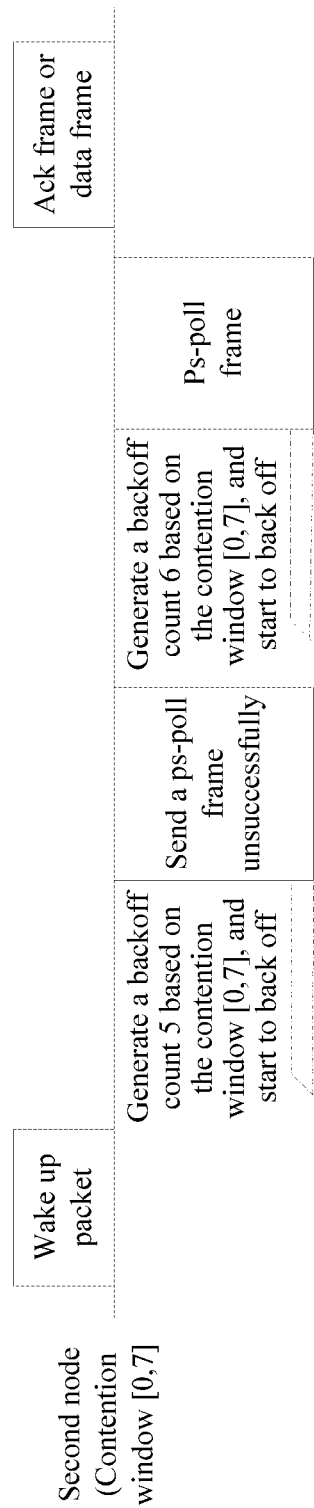
FIG. 12A is a schematic diagram in which a second node retransmits an unsuccessfully sent ps-poll frame according to an embodiment of the present application.

For example, referring to FIG. 12A, the first frame that is sent by the woken up second node is a ps-poll frame. After receiving the wake up packet, the second node randomly generates a backoff count 5 based on a contention window [0,7], executes backoff based on the backoff count, and sends the ps-poll frame to the first node after backoff ends. If sending the ps-poll frame unsuccessfully, the second node continues randomly generating a backoff count based on the contention window [0,7], where, for example, a new backoff count is 6, executes backoff based on the new backoff count, and resends the ps-poll frame to the first node after backoff ends.

In a second manner, when the main transceiver of the second node sends the unsuccessfully sent frame to the first node, the second node performs again a step of sending the unsuccessfully sent frame to the first node based on the backoff count. In other words, after the second node generates the backoff count by using the maintained contention window, when the second node wakes up and sends the first frame unsuccessfully, the second node executes backoff still based on the backoff count subsequently, where the contention window is kept unchanged.

Figure 12B:
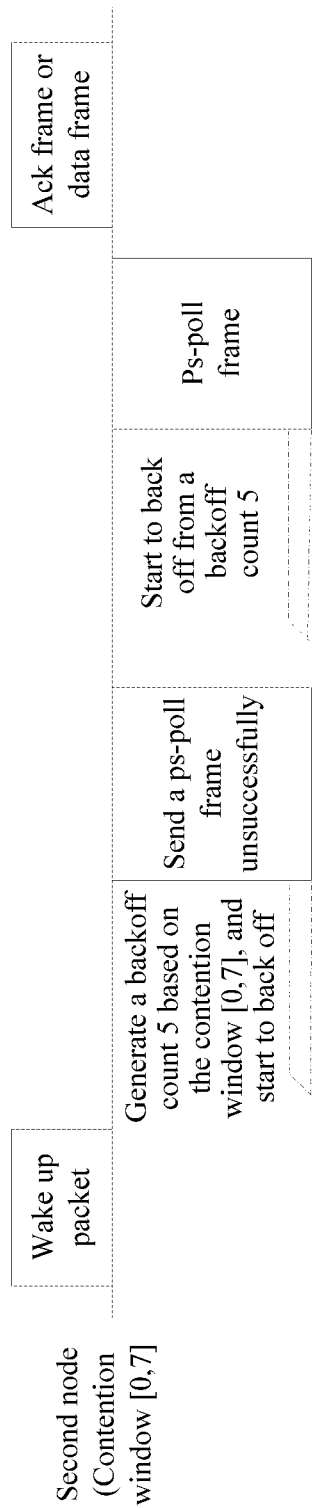
FIG. 12B is a schematic diagram of retransmitting an unsuccessfully sent ps-poll frame by a second node according to another embodiment of the present application.

For example, referring to FIG. 12B, the first frame that is sent by the woken up second node is a ps-poll frame. After receiving the wake up packet, the second node obtains a contention window [0,7] from the wake up packet, randomly generates a backoff count 5 based on the contention window, executes backoff based on the backoff count, and sends the ps-poll frame to the first node after backoff ends. If sending the ps-poll frame unsuccessfully, the second node continues executing backoff based on the original backoff count 5, and resends the ps-poll frame to the first node after backoff ends.

During actual application, the first node may also add a 1-bit indication field to the wake up packet. The indication field may be used to indicate a backoff manner used by the woken up main transceiver of the second node to send the first frame according to a backoff mechanism.

For example, when a value of the indication field is a first value, it indicates that the second node performs again a step of generating a backoff count based on a contention window, executing backoff based on the backoff count, and sending the unsuccessfully sent frame to the first node when backoff ends.

When a value of the indication field is a second value, it indicates that the second node performs again a step of executing backoff based on the backoff count, and sending the unsuccessfully sent frame to the first node when backoff ends, where the contention window is kept unchanged.

In another implementation, the second node may maintain CW3_min and CW3_max to send the first frame. The CW3_min and CW3_max are determined by a window parameter field in the received wake up packet, or determined by a window parameter field in a wake-up beacon frame broadcast by an AP or a beacon frame broadcast by an AP. When the second node performs retransmission after sending the first frame unsuccessfully, a process of updating of the contention window is the same as a process of updating, based on CW3_min and CW3_max that are maintained on the second channel, the contention window for which the first node sends the wake up packet in the foregoing example. Details are not repeated in the present application herein.

It should be further noted that, the embodiments are applicable to scenarios in which an AP wakes up a non-AP station, a non-AP station wakes up an AP, a non-AP station wakes up another non-AP station, and the like. However, the beacon frame (or the wake-up beacon frame) and the association response frame described in the embodiments can only be sent by the AP.

In a possible implementation, this application further provides an apparatus for sending a wake up packet. The apparatus for sending a wake up packet may include a sending unit, and the sending unit is configured to implement a function of at least one step 702 and step 703. For details, refer to the foregoing method embodiment. Optionally, in this embodiment of the present application, the sending unit may be implemented by the main transceiver 520 shown in FIG. 5.

In another possible implementation, this application further provides an apparatus for sending a wake up packet. The apparatus for sending a wake up packet may include a sending unit, and the sending unit is configured to implement a function of step 803.

For details, refer to the foregoing method embodiment.

Optionally, in this embodiment of the present application, the sending unit may be implemented by the main transceiver 520 shown in FIG. 5.

Figure 13:
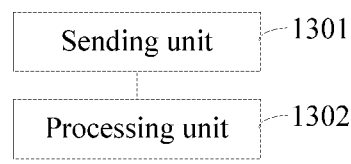
FIG. 13 is a schematic structural diagram of an apparatus for sending a wake up packet according to an embodiment of the present application.

In another possible implementation, this application further provides an apparatus for sending a wake up packet. Referring to FIG. 13, the apparatus for sending a wake up packet may include a sending unit 1301 and a processing unit 1302.

The sending unit 1301 is configured to generate a backoff count based on a first contention window, execute backoff based on the backoff count, and send a wake up packet to a second node on a second channel when backoff ends. The second channel is a channel on which a wake up receiver of the second node works.

Optionally, the sending unit 1301 is further configured to when the wake up packet is sent unsuccessfully, keep the first contention window unchanged on the second channel.

Optionally, the first node maintains a second contention window CW2 on the second channel, and the CW2 is updated based on a minimum contention window CW2_min and a maximum contention window CW2_max that are maintained on the second channel.

The processing unit 1302 is configured to when the wake up packet is sent unsuccessfully, update the current CW2 to (CW2+1)*2−1. The updated CW2 does not exceed CW2_max.

The processing unit 1302 is further configured to when the wake up packet is sent successfully, reset CW2 to CW2_min.

Optionally, CW2_min and CW2_max are specified by an AP.

Optionally, the sending unit 1301 is further configured to when a main transceiver of the first node needs to send an 802.11 frame on the first channel, read a backoff count maintained on the first channel, execute backoff based on the backoff count, and send the 802.11 frame when backoff ends.

Optionally, the sending unit 1301 is further configured to select any service priority or define a new service priority to send the wake up packet.

For details, refer to the foregoing method embodiment.

Optionally, in this embodiment of the present application, the sending unit 1301 and the processing unit 1302 may be implemented by the main transceiver 520 shown in FIG. 5.

It should be noted that, when the apparatus for sending a wake up packet provided in the foregoing embodiment sends a wake up packet, division of the foregoing program modules is merely used as an example for description. During actual application, the foregoing functions may be allocated to different program modules as required for implementation. In other words, an internal structure of the first node is divided into different program modules to implement all or some of the foregoing functions. In addition, the apparatus for sending a wake up packet and the method for sending a wake up packet provided in the foregoing embodiments belong to a same concept. For a specific implementation process, refer to the method embodiment. Details are not repeated herein.

In an example embodiment, a non-transitory computer readable storage medium containing an instruction, for example, a memory containing an instruction, is further provided. The instruction may be executed by a processor and a main transceiver of a first node to implement the method for sending a wake up packet. For example, the non-transitory computer readable storage medium may be a ROM, a random-access memory (RAM), a CD-ROM, a magnetic tape, a floppy disk, an optical data storage device, or the like.

Figure 14:
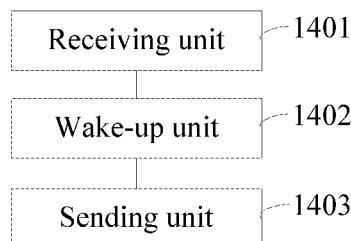
FIG. 14 is a schematic structural diagram of an apparatus for sending a first frame after node wake-up according to an embodiment of the present application.

Referring to FIG. 14, FIG. 14 is a schematic structural diagram of an apparatus for sending a first frame after node wake-up according to an embodiment of the present application. The apparatus for sending a first frame after node wake-up may become an entire or a part of a receiving device by using software, hardware, or a combination of software and hardware. The apparatus for sending a first frame after node wake-up may include a receiving unit 1401, a wake-up unit 1402, and a sending unit 1403.

The receiving unit 1401 is configured to implement a function of receiving a wake up packet sent by a first node in step 1101.

The wake-up unit 1402 is configured to implement a function of waking up a main transceiver of a second node in step 1101.

The sending unit 1403 is configured to implement a function of step 1102.

For details, refer to the foregoing method embodiment.

Optionally, in this embodiment of the present application, the receiving unit 1401 and the wake-up unit 1402 may be implemented by the wake up receiver 630 shown in FIG. 6, and the sending unit 1403 may be implemented by the main transceiver 620 shown in FIG. 6.

It should be noted that, when the apparatus for sending a first frame after node wake-up provided in the foregoing embodiment sends a first frame after the second node wakes up, division of the foregoing program modules is merely used as an example for description. During actual application, the foregoing functions may be allocated to different program modules as required for implementation. In other words, an internal structure of the second node is divided into different program modules to implement all or some of the foregoing functions. In addition, the apparatus for sending a first frame after node wake-up and the method for sending a first frame after node wake-up provided in the foregoing embodiment belong to a same concept. For a specific implementation process, refer to the method embodiment. Details are not repeated herein.

In an example embodiment, a non-transitory computer readable storage medium containing an instruction, for example, a memory containing an instruction, is further provided. The instruction may be executed by a wake up receiver and a main transceiver of a second node to implement the method for sending a first frame after node wake-up. For example, the non-transitory computer readable storage medium may be a ROM, a random-access memory (RAM), a CD-ROM, a magnetic tape, a floppy disk, an optical data storage device, or the like.

An embodiment of the present application further provides a wake up packet sending system. The wake up packet sending system includes a first node and at least one second node. The first node includes the apparatus for sending a wake up packet shown in FIG. 13, and the second node includes the apparatus for sending a first frame after node wake-up shown in FIG. 14. For details, refer to the descriptions of FIG. 13 and FIG. 14. Details are not repeated herein.

The technical terms or scientific terms used herein should have general meanings understood by a person of ordinary skill in the art of the present application, unless otherwise specified. "First", "second", and similar terms used in the specification and claims of this application do not denote any sequence, quantity, or importance, and are only used to distinguish different constituents. Likewise, "one", "a", or similar terms do not denote a quantity limitation, either, but means at least one. "Connected to", "connected with", or similar terms does not limit to a physical or machinery connection, and the connection may include a direct or indirect electrical connection.

It should be further noted that, "transmit end" and "receive end" used in the specification and claims of this application merely represent two information sending ends, and do not limit a function of either side. For example, the transmit end may also receive information or perform other operations, and the receive end may also send information or perform other operations. Apparently, the information herein may be any type of a frame.

A person of ordinary skill in the art may understand that all or some of the steps of the embodiments may be implemented by hardware or a program instructing related hardware. The program may be stored in a computer readable storage medium. The storage medium may include a read-only memory, a magnetic disk, or an optical disc.

The foregoing descriptions are merely optional embodiments of this application, but are not intended to limit this application. Any modification, equivalent replacement, or improvement made without departing from the principle of this application shall fall within the protection scope of this application.

What is claimed is:

1. A method, comprising:
   setting, by a first node, a network allocation vector (NAV) according to a frame on the first channel, wherein the first channel is a channel on which a main transceiver of a second node works, wherein the first node is an access point (AP);
   detecting whether a second channel is idle while the NAV is set, wherein the second channel is a channel on which a wake up receiver of the second node works, wherein the first channel is a wireless transmission channel, and wherein the second channel is a wireless transmission channel;
   generating, by a first node that maintains a first contention window (CW1) in response to detecting that the second channel is idle, a backoff count according to CW1;
   executing, by the first node, a backoff according to the backoff count; and
   sending, by the first node, a wake up packet of a wake up beacon frame to the second node on a second channel in response to the backoff ending by the backoff count generated reaching a stopping count, further in response to the NAV being set for the first node by the frame on the first channel and the second channel being idle.

2. The method according to claim 1, wherein the method further comprises:
   obtaining an access category used for sending the wake up packet, wherein the obtaining the access category comprises performing at least one of selecting an access category or defining a new access category.

3. The method according to claim 1, wherein the method further comprises:
   keeping CW1 unchanged on the second channel in response to the wake up packet being sent unsuccessfully.

4. The method according to claim 1, wherein the first node maintains a second contention window (CW2) on the second channel, wherein CW2 is updated according to a minimum contention window (CW2_min) and a maximum contention window (CW2_max) that are maintained on the second channel; and
   wherein the method further comprises performing at least one of:
   updating CW2 to (CW2+1)*2−1 in response to the wake up packet being sent unsuccessfully, wherein the updated CW2 does not exceed CW2_max; or
   resetting CW2 to CW2_min in response to the wake up packet being sent successfully.

5. The method according to claim 4, wherein CW2_min and CW2_max are specified by the access point (AP).

6. The method according to claim 4, wherein CW2 is a variable contention window.

7. The method according to claim 1, wherein the method further comprises:
   reading the backoff count maintained on the first channel in response to a main transceiver of the first node returning to the first channel to send an 802.11 frame;
   executing the backoff according to the backoff count; and
   sending the 802.11 frame on the first channel after the backoff ends.

8. A first node, comprising:
   a main transceiver;
   a processor; and
   a non-transitory computer-readable storage medium storing a program to be executed by the processor, the program including instructions to:
   maintain a first contention window (CW1) on a first channel, wherein the first channel is a channel on which a main transceiver of a second node works, wherein the first node is an access point (AP);
   set a network allocation vector (NAV) according to a frame on the first channel, wherein the first channel is a channel on which a main transceiver of a second node works, wherein the first node is an access point (AP);
   detect whether a second channel is idle while the NAV is set, wherein the second channel is a channel on which a wake up receiver of the second node works, wherein the first channel is a wireless transmission channel, and wherein the second channel is a wireless transmission channel;
   generate a backoff count according to CW1 in response to detecting that the second channel is idle;
   execute a backoff according to the backoff count; and
   cause the main transceiver to send a wake up packet of a wake up beacon frame to the second node on a second channel in response to the backoff ending by the backoff count generated reaching a stopping count, further in response to the NAV being set for the first node by the frame on the first channel and the second channel being idle.

9. The first node according to claim 8, wherein the program further includes instructions to obtain an access category used for sending the wake up packet, wherein the instructions to obtain the access category include instructions to perform at least one of select an access category or define a new access category.

10. The first node according to claim 8, the program further includes instructions to keep CW1 unchanged on the second channel in response to the wake up packet being sent unsuccessfully.

11. The first node according to claim 8, wherein the first node maintains a second contention window (CW2) on the second channel, and wherein CW2 is updated based on a minimum contention window (CW2_min) and a maximum contention window (CW2_max) that are maintained on the second channel; and wherein the program further includes instructions to:
  update the CW2 to (CW2+1)*2−1 in response to the wake up packet being sent unsuccessfully, wherein the updated CW2 does not exceed CW2_max; and
  reset CW2 to CW2_min in response to the wake up packet being sent successfully.

12. The first node according to claim 11, wherein CW2_min and CW2_max are specified by the access point (AP).

13. The first node according to claim 11, wherein CW2 is a variable contention window.

14. The first node according to claim 8, wherein the program further includes instructions to:
  read the backoff count maintained on the first channel in response to the main transceiver of the first node returning to the first channel to send an 802.11 frame;
  execute the backoff according to the backoff count; and
  cause the main transceiver to send the 802.11 frame on the first channel after the backoff ends.

15. An apparatus, comprising:
  a processor; and
  a non-transitory computer-readable storage medium storing a program to be executed by the processor, the program including instructions to:
    act as a first node, and the first node is an access point (AP);
    set a network allocation vector (NAV) according to a frame on the first channel, wherein the first channel is a channel on which a main transceiver of a second node works, wherein the first node is an access point (AP);
    detect whether a second channel is idle when the NAV is set, wherein the second channel is a channel on which a wake up receiver of the second node works, wherein the first channel is a wireless transmission channel, and wherein the second channel is a wireless transmission channel;
    maintain a first contention window (CW1) in response to detecting that the second channel is idle;
    generate a backoff count according to CW1;
    execute a backoff based on the backoff count; and
    send a wake up packet of a wake up beacon frame to the second node on a second channel in response to the backoff ending by the backoff count generated reaching a stopping count, further in response to the NAV is being for the first node by the frame on the first channel and the second channel being idle, wherein the second channel is a channel on which a wake up receiver of the second node works, wherein the first channel is a wireless transmission channel, and wherein the second channel is a wireless transmission channel.

16. The apparatus according to claim 15, wherein the program further includes instructions to:
  obtain an access category used for sending the wake up packet, wherein the instructions to obtain the access category include instructions to perform at least one of select an access category or define a new access category.

17. The apparatus according to claim 15, wherein the program further includes instructions to:
  keep CW1 unchanged on the second channel in response to the wake up packet being sent unsuccessfully.

18. The apparatus according to claim 15, wherein the apparatus maintains a second contention window (CW2) on the second channel, wherein CW2 is updated based on a minimum contention window (CW2_min) and a maximum contention window (CW2_max) that are maintained on the second channel; and
  wherein the program further includes instructions to:
    update the CW2 to (CW2+1)*2−1 in response to when the wake up packet being sent unsuccessfully, wherein the updated CW2 does not exceed CW2_max; and
    reset CW2 to CW2_min in response to the wake up packet being sent successfully.

19. The apparatus according to claim 18, wherein CW2_min and CW2_max are specified by the access point (AP).

20. The apparatus according to claim 15, wherein the program further includes instructions to:
  read the backoff count maintained on the first channel in response to a main transceiver of the apparatus returns to the first channel to send an 802.11 frame;
  execute the backoff in response to the backoff count; and
  send the 802.11 frame after the backoff ends.

* * * * *